(12) United States Patent
Lim

(10) Patent No.: US 8,799,663 B2
(45) Date of Patent: *Aug. 5, 2014

(54) METHOD AND A SYSTEM FOR A SECURE EXECUTION OF WORKFLOW TASKS OF A WORKFLOW IN A DECENTRALIZED WORKFLOW SYSTEM

(75) Inventor: Hoon Wei Lim, Antibes (FR)

(73) Assignee: SAP AG, Walldorf (DE)

( * ) Notice: Subject to any disclaimer, the term of this patent is extended or adjusted under 35 U.S.C. 154(b) by 23 days.

This patent is subject to a terminal disclaimer.

(21) Appl. No.: 13/619,708

(22) Filed: Sep. 14, 2012

(65) Prior Publication Data

US 2013/0073858 A1    Mar. 21, 2013

Related U.S. Application Data

(63) Continuation of application No. 12/758,264, filed on Apr. 12, 2010, now Pat. No. 8,291,232.

(30) Foreign Application Priority Data

May 7, 2009    (EP) .................................... 09290331

(51) Int. Cl.
| | |
|---|---|
| *H04L 29/06* | (2006.01) |
| *G06F 21/62* | (2013.01) |
| *H04L 9/08* | (2006.01) |
| *G06F 21/64* | (2013.01) |
| *H04L 9/32* | (2006.01) |
| *H04L 9/30* | (2006.01) |
| *H04L 9/00* | (2006.01) |

(52) U.S. Cl.
CPC .............. *G06F 21/64* (2013.01); *G06F 21/629* (2013.01); *G06F 21/6218* (2013.01); *H04L 9/0891* (2013.01); *H04L 2209/38* (2013.01); *G06F 2221/2145* (2013.01); *H04L 2209/42* (2013.01); *H04L 9/3247* (2013.01); *H04L 9/3073* (2013.01); *H04L 9/007* (2013.01); *G06F 2221/2107* (2013.01)
USPC .............................................. 713/176; 380/44

(58) Field of Classification Search
CPC ......... G06F 21/62; G06F 21/57; G06F 21/70; G06F 21/71; H04L 63/0442
USPC ............. 713/176, 180, 179; 380/283, 278, 44
See application file for complete search history.

(56) References Cited

U.S. PATENT DOCUMENTS

| | | |
|---|---|---|
| 8,291,232 B2 | 10/2012 | Lim |
| 2003/0217264 A1* | 11/2003 | Martin et al. ................. 713/156 |

OTHER PUBLICATIONS

"U.S. Appl. No. 12/758,264, Non Final Office Action mailed Feb. 23, 2012", 10 pgs.

(Continued)

*Primary Examiner* — Edward Zee

(74) *Attorney, Agent, or Firm* — Schwegman, Lundberg & Woessner, P.A.

(57) ABSTRACT

Secure execution of workflow tasks are executed according to a given execution pattern in a decentralized workflow system with a central workflow engine and multiple task execution agents. The method starts at an i'th execution agent which is selected by at least one preceding execution agent in accord with the execution pattern to perform an i'th task of the workflow. The method includes receiving, from the at least one preceding execution agent via a secure channel, a task-based private key generated by the at least one preceding execution agent, signing workflow information of the workflow for at least one subsequent execution agent with a workflow signature, selecting at least one appropriate subsequent execution agent, computing a task-based private key for the at least one subsequent execution agent, and forwarding to the at least one subsequent execution agent the workflow information with its associated workflow signature.

18 Claims, 7 Drawing Sheets

(56) References Cited

OTHER PUBLICATIONS

"U.S. Appl. No. 12/758,264, Notice of Allowance mailed Jun. 12, 2012", 9 pgs.

"U.S. Appl. No. 12/758,264, Response filed May 22, 2012 to Non Final Office Action mailed Feb. 23, 2012", 13 pgs.

"European Application Serial No. 09290331.9, Extended European Search Report mailed Jun. 10, 2009", 7 pgs.

"European Application Serial No. 09290331.9, Response to Written Opinion mailed Dec. 15, 2009", 6 pgs.

"Multiprecision Integer and Rational Arithmetic C/C++ Library", [Online]. Retrieved from the Internet: <URL: http://www.shamus.ie/index.php?page=home>, (Accessed Apr. 21, 2010), 2 pgs.

Atluri, Vijay, "Security for Workflow Systems", Information Securyt Technical Report 6(2), (2001), 59-68.

Atluri, Vijayalakshmi, et al., "Chinese Wall Security for Decentralized Workflow Management Systems", Journal of Computer Security vol. 12, Issue 6, (Dec. 2004), 799-840.

Dierks, T., et al., "The TLS Protocol Version 1.0", The Internet Society: Network Working Group, [Online]. Retrieved from the Internet: <URL: http://www.ietf.org/rfc/rfc2246.txt>, (Jan. 1999), 81 pgs.

Galbraith, S.D., et al., "Supersingular Curves in Cryptography", Proceedings of Asiacrypt, LCNS 2248, (Dec. 2001), 495-513.

Galbraith, Steven D., et al., "Pairings for Cryptographers", Cryptology ePrint Archive Report 2006/165, (May 2006), 11 pgs.

Gentry, Craig, et al., "Hierarchical ID-based cryptography", Lecture Notes in Computer Science; vol. 2501, Proceedings of the 8th International Conference on the Theory and Application of Cryptology and Information Security: Advances in Cryptology, (2002), 548-566.

Horwitz, Jeremy, et al., "Towards Hierarchical Identity-Based Encryption", Advances in Cryptology-Proceedings of Eurocrypt (LNCS 2332), (2002), 466-481.

Lim, Hoon Wei, et al., "Multi-key Hierarchical Identity-Based Signatures", Cryptography and Coding, (Dec. 2007), 384-402.

Lim, Hoon Wei, et al., "What Can Identity-Based Cryptography Offer to Web Services", ACM Workshop on Secure Web Services (SWS), [Online]. Retrieved from the Internet: <URL: http://ra.crema.unimi.it/sws07/Lim.ppt>, (Nov. 2, 2007), 18 pgs.

Montagut, Frederic, "Pervasive Workflows Architecture, Reliability and Security", PhD Thesis, [Online]. Retrieved from the Internet: <URL: http://pastel.paristech.org/3059/01/main.pdf>, (Oct. 15, 2007), 222 pgs.

Montagut, Frederic, et al., "Traceability and Integrity of Execution in Distributed Workflow Management Systems", Computer Security, [Online]. Retrieved from the Internet: <URL: http://www.eurecom.fr/util/publidownload.en.htm?id=2254>, (2007), 251-266.

\* cited by examiner

ROOT SETUP: The CWE:

1. runs $\mathcal{G}$ on input $\lambda$ to generate $\mathbb{G}$ and $\mathbb{G}_T$ of prime order $q$ and an admissible pairing $e : \mathbb{G} \times \mathbb{G} \to \mathbb{G}_T$;
2. chooses a generator $P_0 \in \mathbb{G}$;
3. picks a random value $s_0 \in \mathbb{Z}_q^*$ and sets $Q_0 = s_0 P_0$;
4. selects cryptographic hash functions $H_1 : \{0,1\}^* \to \mathbb{G}$ and $H_2 : \{0,1\}^* \to \mathbb{G}$.

The CWE's master secret is $s_0$ and the system parameters are $(\mathbb{G}, \mathbb{G}_T, e, q, P_0, Q_0, H_1, H_2)$. The message space is $\mathcal{M} = \{0,1\}^*$ and the signature space is $\mathcal{S} = \bigcup_{i \geq 0} \mathbb{G}^{i+1}$.

NEXT-LEVEL SETUP: An execution agent at position $t \geq 1$ in a workflow picks a random secret $s_t \in \mathbb{Z}_q^*$.

EXTRACT: An agent with one or multiple identifiers $\mathsf{ID} = \{\mathrm{ID}_{(t-1)}^j : 1 \leq j \leq m\}$ issues a private key for another agent at position $t$ with identifier $\mathrm{ID}_t = \mathrm{ID}_{(t-1)_1}^1, \cdots, \mathrm{ID}_{(t-1)_m}^m, id_t$ by performing the following steps:

1. computes $P_t = H_1(\mathrm{ID}_t) \in \mathbb{G}$;
2. sets $S_t = \sum_{j=1}^n S_{(t-1)_j}^j + s_{t-1} P_t$;
3. defines $\mathsf{Q} = \{Q_i^j = s_i P_0 : 1 \leq i \leq (t-1)_j, 1 \leq j \leq m\}$.

The private key $(S_t, \mathsf{Q})$ is given to the agent by its parent.

SIGN: Given any $n \geq 1$ and a set $\mathsf{SK} = \{(S_{t_j}^j, Q_i^j) : 1 \leq j \leq n, 1 \leq i \leq t_j - 1\}$ of $n$ private keys associated with a set $\mathsf{ID} = \{\mathrm{ID}_{t_j}^j : 1 \leq j \leq n\}$ of identifiers, and a message $M$, the signer:

1. chooses a secret value $s_\varphi \in \mathbb{Z}_q^*$;
2. computes $P_M = H_2(\mathrm{ID}_{t_1}^1, \cdots, \mathrm{ID}_{t_n}^n \| M)$;[3]
3. calculates $$\varphi = \sum_{j=1}^n S_{t_j}^j + s_\varphi P_M \quad \text{and} \quad Q_\varphi = s_\varphi P_0.$$

The algorithm outputs the signature $\sigma = (\varphi, \mathsf{Q}, Q_\varphi)$, where $\mathsf{Q} = \{Q_i^j : 1 \leq i \leq t_j - 1, 1 \leq j \leq n\}$.

VERIFY: Given $\sigma = (\varphi, \mathsf{Q}, Q_\varphi)$, a set of identifiers $\mathsf{ID} = \{\mathrm{ID}_{t_1}^1, \cdots, \mathrm{ID}_{t_n}^n\}$ and a message $M$, the verifier:

1. computes $P_i^j = H_1(\mathrm{ID}_i^j)$ for $1 \leq i \leq t_j$ and $1 \leq j \leq n$;
2. computes $P_M = H_2(\mathrm{ID}_{t_1}^1, \cdots, \mathrm{ID}_{t_n}^n \| M)$ (first arranging the identifiers lexicographically if they are not already in this order);
3. checks if $e(P_0, \varphi)$ is equal to $$\left( \prod_{j=1}^n \prod_{i=1}^{t_j} e(Q_{i-1}^j, P_i^j) \right) \cdot e(Q_\varphi, P_M),$$

outputting valid if this equation holds, and invalid otherwise.

Figure 3

| Agent | Identifiers | Public keys | Private keys |
|---|---|---|---|
| $A(t_1)$ | $ID_1 = t_1 \| LT_1$ | $P_1 = H_1(ID_1)$ | $S_1 = s_0 P_1$ |
| $A(t_2)$ | $ID_2 = t_1, t_2 \| LT_2$ | $P_2 = H_1(ID_2)$ | $S_2 = S_1 + s_1 P_2$ <br> $Q_1 = s_1 P_0$ |
| $A(t_3)$ | $ID_3 = t_1, t_2, t_3 \| LT_3$ | $P_3 = H_1(ID_3)$ | $S_3 = S_2 + s_2 P_3$ <br> $Q_2 = s_2 P_0$ |
| $A(t_4)$ | $ID_4^1 = t_1, t_2, t_4 \| LT_4^1$ <br> $ID_4^2 = t_1, t_2, t_3, t_4 \| LT_4^2$ | $P_4^1 = H_1(ID_4^1)$ <br> $P_4^2 = H_1(ID_4^2)$ | $S_4^1 = S_2 + s_2 P_4^1$ <br> $S_4^2 = S_3 + s_3 P_4^2$ <br> $Q_1, Q_2, Q_3 = s_3 P_0$ |
| $A(t_5)$ | $ID_5 = ID_4^1, ID_4^2, t_5 \| LT_5$ | $P_5 = H_1(ID_5)$ | $S_5 = S_4^1 + S_4^2 + s_4 P_5$ <br> $Q_1, Q_2, Q_3, Q_4 = s_4 P_0$ |

Figure 5

METHOD AND A SYSTEM FOR A SECURE EXECUTION OF WORKFLOW TASKS OF A WORKFLOW IN A DECENTRALIZED WORKFLOW SYSTEM

CLAIM OF PRIORITY

The present patent application is a continuation of and claims the benefit of priority under 35 U.S.C. §120 to U.S. patent application Ser. No. 12/758,264, filed on Apr. 12, 2010, which claims the priority benefit of the filing date of European Application (EPO) No. 09290331.9 filed May 7, 2009, the benefit of priority of each of which is claimed hereby, and each of which are incorporated by reference herein in its entirety.

TECHNICAL FIELD

This description relates to basic security issues of workflow systems, particularly in terms of authenticity and integrity protection of workflow information and sequence.

BACKGROUND

Deployment of cross-organizational applications is becoming a norm in recent years. One key reason for this may be because of the impact of pervasive adoption and usage of the internet. Furthermore, there seem to be growing needs for organizations to cooperate and collaborate, for mutual business gain, for example, or sometimes even to share resources to achieve various common goals. The advancement of distributed computing technologies, such as service-oriented and grid computing enables quicker and wider deployment of cross-organizational applications than before.

In today's business world, one major challenge for an enterprise is the need for agility in order to survive in very competitive business environments characterized by fast-paced market development, increased time-to-market pressure and shortened product life-cycles. Forming a business alliance with appropriate business partners is a common strategy for an enterprise to stay ahead of competitors by offering a one-stop solution or a complete service package to its customers. In such an environment, cross-enterprise applications, such as inter-organizational workflow management systems, play a key role for executing business processes among business partners in a timely and automated manner.

An inter-organizational workflow management system is used to model and control the execution of processes involving a combination of manual and automated activities between different organizations. Such a workflow management system can be either centralized or decentralized. The decentralized workflow management system is usually preferred because of its scalability, and the heterogeneous and autonomous nature of inter-organizational interactions.

In a centralized workflow system, there exists a single workflow management engine that is responsible for distributing tasks to appropriate execution agents. The central workflow engine also ensures the specified task dependencies by sending tasks to the respective execution agents only when all requisite conditions are satisfied.

In a decentralized workflow system, on the other hand, a central workflow engine only sends the entire workflow to a first execution agent and receives the final output from the last execution agent in the workflow. The workflow control in this case is localized, in the sense that each execution agent in the workflow is responsible not only for executing an assigned task, but also needs to evaluate the following task dependencies and forward the remaining workflow to the next execution agent.

BRIEF DESCRIPTION OF THE DRAWINGS

In the drawings,

FIG. 3 shows schematically the workflow signature scheme as it can be used in a possible example embodiment of the proposed method or system;

FIG. 5 shows a table indicating a task-based public-private key set for each execution agent involved in the workflow shown in FIG. 4.

DETAILED DESCRIPTION

Figure 1:
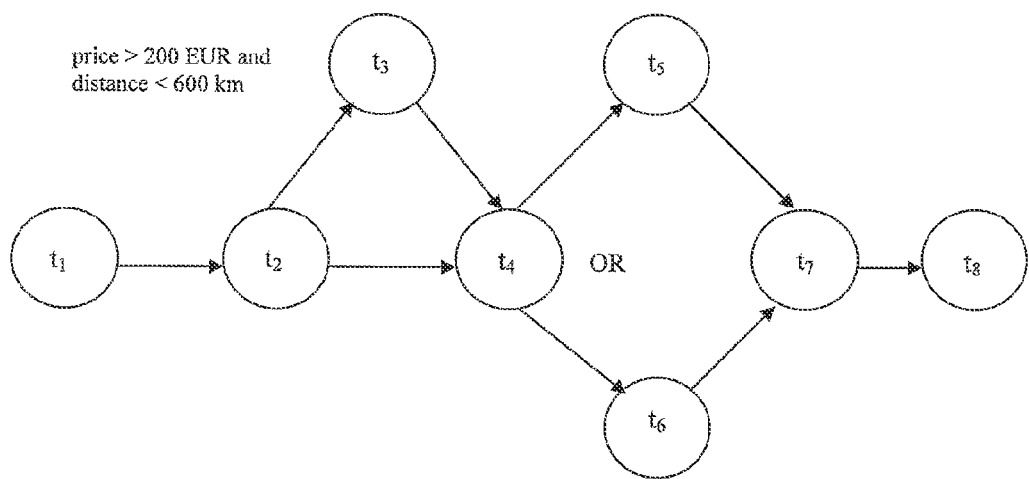
FIG. 1 graphically shows a workflow of a business travel planning process.

Most security related existing work in workflow systems focuses on various access control aspects of workflow systems, such as access control modeling, temporal authorization, workflow constraints and so forth. However, there seems to be very small amount of work that examines basic security issues of workflow systems, particularly in terms of authenticity and integrity protection of workflow information and sequence. Current proposals usually assume the existence of appropriate complementary security mechanisms and infrastructures that can prove authenticity and integrity of workflow information.

In a centralized workflow setting, it seems relatively easy to ensure authenticity and integrity of workflow information, assuming each execution agent shares some secret information with the central workflow engine in the form of a password, for example. This is because transmission of workflow information between two execution agents must go through the central workflow engine, which in turn, can act as a trusted authority that authenticates an execution agent and checks the integrity of the information based on a shared secret value.

On the other hand, in a decentralized workflow setting, workflow information is forwarded from one execution agent to another execution agent in a decentralized and more flexible way without going through the central workflow engine. Therefore, it seems inevitable that public key cryptographic techniques, and hence some sort of public key infrastructures, are required to provide security features such as data authenticity and integrity. A simple but rather naïve solution may be as the following. Assuming that each execution agent possesses a public-private key pair certified by a trusted authority. Workflow information transmitted between two execution agents can then be digitally signed using the relevant signing key to prove origin and to detect any unauthorized modification of the workflow information. However, one major deficit of this approach is that it does not protect the anonymity of execution agents. The protection of the anonymity is an essential feature for coping with conflict of interests among competing organizations. Furthermore, it is good practice to grant a subject access to required objects only during the execution of the specified task. This is essential to synchronize the authorization flow with the corresponding workflow. This also implies that from a cryptographic key management perspective, keys should be associated and synchronized with an authorization flow. That means that access to a key should only be granted during the execution of a respective task. This cannot be achieved by using the aforementioned naïve approach.

In one general aspect, a method for a secure execution of workflow tasks of a workflow to be executed according to a given execution pattern in a decentralized workflow system with a central workflow engine initiating the workflow and a plurality of task execution agents is proposed. Thereby, the central workflow engine and each task execution agent may own a long-term public-private key pair, respectively, which is used for distributing respective task-based public-private key pairs which in turn are used to protect workflow information. According to the proposed method, the task-based public-private keys are produced using a workflow signature scheme. The proposed method comprises, starting at an i'th execution agent which is selected by at least one preceding execution agent in accord with the execution pattern to perform an i'th task of the workflow, at least the following operations:

receiving, from the at least one preceding execution agent via a secure channel, a task-based private key, which is generated by the at least one preceding execution agent;

signing workflow information of the workflow for at least one subsequent execution agent with a workflow signature, the workflow signature being computed using the workflow signature scheme by taking as input at least the task-based private key which is generated by the at least one preceding execution agent;

selecting at least one appropriate subsequent execution agent;

computing a task-based private key for the at least one subsequent execution agent wherein the task-based private key is computed using cryptographic system parameters and a workflow identifier assigned to the subsequent execution agent;

forwarding to the at least one subsequent execution agent the workflow information with its associated workflow signature, the cryptographic system parameters and the task-based private key for the at least one subsequent execution agent through a secure channel which is generally established using the long-term private key of the i'th execution agent.

Generally, the workflow signature scheme also requires cryptographic system parameters which are provided by the central workflow engine. The central workflow engine generally generates those cryptographic system parameters. Those cryptographic system parameters are generally passed over from one execution agent to one or more subsequent execution agents in accord with the execution pattern. That means that a first execution agent which has to execute a first workflow task of the workflow generally receives the cryptographic system parameters directly from the central workflow engine and forwards those cryptographic system parameters further to at least one subsequent execution agent which has to execute a workflow task subsequent to the first workflow task. Generally, at least a respective part of the cryptographic system parameters is used, by the i'th execution agent, to compute the workflow signature and the task-based private key, respectively.

The workflow identifier assigned to the subsequent execution agent reflects the subsequent execution agent's position and logical integration in the workflow.

In the context of the present disclosure, the wording "one preceding execution agent" stands for an execution agent which executes a task, according to the underlying workflow, prior to the task which is executed by the i'th execution agent.

According to another aspect, the method comprises, starting at the first execution agent of the workflow which is selected by the central workflow engine in accord with the execution pattern to perform a first task of the workflow, at least following operations:

receiving, from the central workflow engine via a secure channel, a task-based private key, and generally also the cryptographic system parameters generally required for the workflow signature scheme which both, the system parameters and the task-based private key generally being generated by the central workflow engine, signing workflow information of the workflow for at least one subsequent execution agent with a workflow signature, the workflow signature being computed using the workflow signature scheme by taking as input at least the task-based private key of the first execution agent, selecting at least one appropriate subsequent execution agent;

computing a task-based private key for the at least one subsequent execution agent wherein the task-based private key is computed using a workflow identifier assigned to the subsequent execution agent, the workflow identifier assigned to the subsequent execution agent reflecting the subsequent execution agent's position and logical integration in the workflow; and forwarding to the at least one subsequent execution agent the workflow information and its associated workflow signature, the system parameters and the task-based private key for the at least one subsequent execution agent through a secure channel which is generally established using the long-term private key of the first execution agent.

The computation of the task-based private key generally also requires usage of the cryptographic system parameters.

The proposed method generally proposes a novel application of hierarchical identity-based cryptography in decentralized workflow systems. The concept of hierarchical identity-based cryptography is further described in documents "C. Gentry and A. Silverberg. Hierarchical ID-based cryptography. In Y. Zheng, editor, Advances in Cryptology—Proceedings of ASIACRYPT 2002, pages 548 to 566. Springer-Verlag LNCS 2501, December 2002" and "J. Horvitz and B. Lynn. Towards hierarchical identity-based encryption. In L. R. Knudsen, editor. Advances in Cryptology—Proceedings of EUROCRYPT 2002, pages 466 to 481. Springer-Verlag LNCS 2332, May 2002".

According to the method described herein, the concept of workflow signatures is introduced in order to capture security properties required for workflow systems. As will be explained in more detail below, hierarchical identity-based signatures are transformed into decentralized workflow signatures, which in turn, can be used to protect integrity of decentralized workflow information and to provide proofs of workflow executions in a natural way.

Furthermore, according to the proposed method, task-based keys are issued dynamically, in the sense that they can be generated after the associated execution agents have been selected at run-time.

Moreover, the concept of multi-key hierarchical identity-based signatures as further described in document "H. W. Lim and E. G. Paterson. Multi-key hierarchical identity-based signatures. In S. D. Galbraith, editor, Proceedings of the 11$^{th}$ IMA International Conference on Cryptography and Coding (IMA 2007), pages 384-402. Springer-Verlag, LNCS 4887, December 2007" can be adapted naturally to reflect a more complex decentralized workflow containing multiple branches, for example, as a result of join/split relations.

Generally, a workflow comprises a set of tasks and the associated task dependencies that control the coordination among these tasks. In a decentralized inter-organizational workflow, execution agents are usually different, autonomous distributed systems, and evaluations of task dependencies are performed by the execution agents without relying on a central workflow engine.

In the following it will be further described how workflow signatures as introduced according to the proposed method can be used in decentralized workflow systems to authenticate execution agents, protect workflow integrity, and provide proofs of commitment for a task execution and proofs of compliance with the corresponding workflow sequence. Furthermore, it can be shown that such workflow signatures also serve to preserve the anonymity of execution agents within a workflow when necessary.

Further details on decentralized workflow systems can be found in document "V. Atluri, S. A. Chun, and P. Mazzoleni. Chinese wall security for decentralized workflow management systems. Journal of Computer Security, 12(6):799-840, December 2004" and a more thorough discussion of security requirements for workflow systems is available in document "V. Atluri. Security for workflow systems. Information Security Technical Report, 6(2):59-68, 2001".

For better understanding, in the following, basic concepts of hierarchical identity-based cryptography and its signature primitive is described. Furthermore, the concept of multi-key hierarchical identity-based signatures is briefly discussed. Subsequent to these explanations, the concept of workflow signatures as used according to the proposed method is introduced and it is further explained how hierarchical identity-based signatures can be turned into workflow signatures.

In hierarchical identity-based cryptography (HIBC), it is assumed that entities can be arranged in a tree structure. There exists the root private key generator (PKG) at the top of the tree, at level 0. Each entity has an identifier. The identifier of an entity is a concatenation of node identifiers in the path from the root of the tree to the node associated with that entity. For instance, the identifier of an entity at level t is the concatenation of node identifiers $id_1, \ldots, id_t$ in which each $id_i \in \{0,1\}$. The concatenation of node identifiers $id_1, \ldots id_t$ is denoted by identifier $ID_t$. The entity with identifier $ID_t$ has an ancestor at level i with identifier $ID_i = id_1, \ldots id_i$ for $1 \le i < t$. The entity's parent is the node with identifier $ID_{t-1}$ and its children are all the nodes with identifiers of the form $ID_{t+1} = id_1, \ldots, id_t, id_{t+1}$.

An entity's public key can then be computed on-the-fly based on its identifier and some pre-defined, cryptographic system parameters which is one major advantage of identity-based cryptography. The corresponding private key is issued by the entity's parent. In other words, entities at one level are trusted to issue private keys to entities immediately below them in the tree. For example, the root PKG, at level 0, produces private keys for entities at level 1, who in turn act as PKGs and issue private keys for entities at level 2, and so on. The public-private key pair of the entity with identifier $ID_t$ is represented by $(P_t, S_t)$. It is to be noted that all entities within the same hierarchy share the same set of system parameters.

Informally, a hierarchical identity-based signature scheme allows an entity within a hierarchy, with identifier $ID_t$, to generate a signature on a message M, by taking as input its private key $S_t$, the message M and the relevant system parameters. Any entity may verify the validity of the signature using the signed message M, the signer's identifier $ID_t$ and the system parameters as input.

As indicated by Lim and Paterson, see also document "H. W. Lim and K. G. Paterson. Multi-key hierarchical identity-based signatures. In S. D. Galbraith, editor, Proceedings of the 11$^{th}$ IMA International Conference on Cryptography and Coding (IMA 2007), pages 384-402. Springer-Verlag LNCS 4887, December 2007", a hierarchical signature scheme can be extended to accommodate multi-key signatures. A multi-key hierarchical signature scheme is used to produce a single signature on a selected message using a set of signing keys. This primitive is useful for applications in which each user owns multiple identifiers and thus possesses a set of corresponding private or signing keys. These identifiers may be located at arbitrary positions in the corresponding hierarchy. When a user generates a signature on a message, he uses a subset of his private keys for signing. It is to be noted that a multi-key hierarchical signature scheme works identically as a standard hierarchical signature scheme when taking as input only one private key for signing. One example application of multi-key hierarchical signatures is that in role-based access control, a user may possess more than one role within an organization. The user's multiple roles, in turn, can be specified as identifiers in hierarchical identity-based cryptography, and the corresponding private keys can then be used for signing access requests.

According to the proposed method the concept of workflow signatures is used for addressing basic security issues of workflow systems, particularly in terms of authenticity and integrity protection of workflow information and sequence. Furthermore, workflow signatures can be used as electronic evidence for providing that a workflow is compliant with some predefined workflow task dependencies and policies. In the following it will be shown how multi-key hierarchical signatures can be adopted in decentralized workflow systems as workflow signatures as introduced according to the proposed method. Furthermore, it will be shown how multi-key hierarchical signatures can be adopted in decentralized workflow systems to cope with various workflow sequence patterns that take into consideration conjunctions and disjunctions of conditions.

By adopting hierarchical signatures in decentralized workflow systems as workflow signatures, two interesting properties get automatically valid for the workflow signatures.

First, identifier assignment indicates commitment. When an execution agent at a level t-1 with identifier $ID_{t-1} = id_1, \ldots, id_{t-1}$ issues a private key $S_t$ to a subsequent execution agent according to the workflow, the identifier $ID_t$ of the subsequent execution agent that receives private key $S_t$ must be set to $id_1, \ldots, id_{t-1}, id_t$, which is in the form of a hierarchical namespace. This implies that the assignment of an execution agent identifier to an existing hierarchical namespace commits the associated execution agent's position in the hierarchy, e.g. in the workflow, and its logical relations with execution agents immediately before and behind it in the workflow, that means its logical relations with execution agents executing tasks prior and after the task which is executed by the associated execution agent itself, respectively.

Second, a hierarchical signature which can be adopted as a workflow signature reflects a chain of signatures. In a traditional hierarchical certificated-based PKI where the underlying cryptographic primitives are based on RSA (Rivest, Shamir and Adelman), for example, a root certificate authority issues certificates, essentially by signing the digital certificates, to certificate authorities immediately below it and a certificate authority at level t-1 in the hierarchy issues signed certificates to entities at level t. This indicates that verification of a signed message produced by an entity at level t involves verifying a chain of signatures, e.g. the signed message and t−1 signed certificates. However, in hierarchical identity-based cryptography, interestingly, a signed message requires only one signature verification, regardless of the location of the signer within a respective hierarchy. The way in which the signer's private key is computed and its relation to the hierarchical namespace of the corresponding identifier provide implicit verification of the validity of the signing key.

The hierarchical structure in the sense of the previously described hierarchical identity-based cryptography can be regarded as decentralized workflow. Each node of the former can be treated as a task execution agent in the latter. Furthermore, a hierarchical namespace can be used to represent a sequence of tasks within a workflow, e.g. a workflow namespace. The parent and child of a node in a hierarchical structure can be used to denote the execution agents before and after an execution agent, respectively, in a workflow. That means, according to the wording of a hierarchical namespace, that execution agents are represented by nodes. Thus, the parent of a node stands for an execution agent executing a task prior to the task which is executed by the execution agent which is represented by the respective node. The child of a node stands for an execution agent executing a task subsequent to the task which is executed by the execution agent which is represented by the respective node.

The workflow signature as introduced and used according to the proposed method is designed a follows.

A workflow signature is to be understood as a digital signature created by a workflow execution agent on workflow information and having the following properties:
 (i) proves the authenticity of the execution agent;
 (ii) protects the integrity of the workflow information being signed;
 (iii) serves as the evidence of the execution agent's commitment in the workflow sequence;
 (iv) proves the execution agent's compliance with the workflow dependencies.

The first two properties of the above-mentioned definition follow from the typical use of standard digital signatures. The third property says that a workflow signature also provides information about the execution agent's position in the associated workflow and that the execution agent is committed to that position without altering the sequence of the previous execution agents in the workflow. Furthermore, using the fourth property, the execution agent can prove completion of a task according to the specified workflow dependencies, including AND/OR-join/split relations.

A classic non-hierarchical digital signature does not satisfy the above-mentioned definition of a workflow signature. In order to capture all properties of the above-mentioned definition it is possible to use a chain of signatures rather than a single signature, constructed in the hierarchical certificate-based PKI setting. Even that, it is still unclear how logical relations in a workflow due to the task dependencies can be demonstrated using a signature in the hierarchical certificate-based approach. Join/split relations can be represented using workflow namespaces as described before.

AND-split refers to the case where a remaining workflow is forwarded to more than one execution agent simultaneously. In the newly introduced workflow signature, this can be demonstrated by simply adding new execution agents to an existing workflow.

AND-join forms a conjunction of multiple task dependencies, implying that multiple execution agents are sending the remaining workflow to the same subsequent execution agent. This is analogous to a multi-key hierarchy, in the sense that the execution agent, who receives workflow information from multiple execution agents, also obtains multiple private keys from them.

OR-split has no explicit impact on the way a workflow namespace is specified in workflow signatures. This is so because it can be realized by appropriately choosing the conditions specified in the associated dependencies, which in turn, implies the addition of a new execution agent in a workflow.

OR-join too, has no explicit impact on a workflow namespace.

It is to be noted that because of the AND/OR-join/split relations the workflow namespace may be significantly more complex than that for multi-key hierarchical signatures. The workflow namespace may comprise a combination of hierarchical namespaces for both hierarchical signatures and multi-key hierarchical signatures. This will be more clear when examples of workflow namespaces in workflow signatures in the context of the following drawings will be provided.

Even though workflow namespaces consider conjunctive and disjunctive relations, only the AND-join relation has impact on how a workflow signature is computed using more than one signing key. It is denoted moreover, that the AND-join relation also effects how private keys are generated for subsequent execution agents in the workflow, so that such a conjunctive relation is captured in the corresponding workflow identifiers. This is one of the essential and key differences between a workflow signature scheme as proposed in the context of the claimed method and a multi-key hierarchical signature scheme.

In the following, the basic concept of pairings is first summarized and afterwards a definition of a workflow signature scheme is given. Then a concrete workflow signature scheme is presented in order to further clarify the general concept of the idea which underlies the proposed method of the present description. Pairings are defined as follows:

Let $G$ and $G_T$ be two cyclic groups where $|G|=|G_T|=q$, a large prime. Then an admissible pairing $e: G \times G \rightarrow G_T$ has the following properties:
 (i) Bilinear: Given P, Q, R $\in$ G we have $e(P,Q+R)=e(P,Q) \cdot e(P,R)$ and $e(P+Q,R)=e(P,R) \cdot e(Q,R)$.
  Hence, for any $a,b \in Z_q^*$, $e(aP,bQ)=e(abP,Q)=e(P,abQ)=e(aP,Q)^b=e(P,Q)^{ab}$.
 (ii) Non-degenerate: There exists P$\in$G such that $e(P, P) \neq 1$.
 (iii) Computable: If P,Q$\in$G, then $e(P,Q)$ can be efficiently computed.

Further details on pairings and their example embodiment using elliptic curves and the Weil, Tate or related pairings can be found in "S. D. Galbraith, K. G. Paterson, and N. P. Smart, Pairings for Cryptographers. Cryptology ePrint Archive, Report 2006/165, May 2006, Available at web address http:// followed by "eprint dot iacr dot org/2006/165." The workflow signature scheme proposed herein is easily adapted to cope with pairings $e: G_1 \times G_2 \rightarrow G_T$, but the focus here is on the simpler case for ease of presentation. Let $\lambda$ denote a security parameter. It is assumed that a randomized algorithm $\mathcal{G}$ is a Bilinear Diffie-Hellman (BDH) parameter generator if: (i) $\mathcal{G}$ takes $\lambda>0$ as input; (ii) $\mathcal{G}$ runs in time polynominal in $\lambda$; and (iii) $\mathcal{G}$ outputs the description of two groups G and $G_T$ of the same prime order q and the description of an admissible pairing $e: G \times G \rightarrow G_t$.

According to one possible example embodiment a workflow signature scheme can comprise five algorithms which are described in the following.

The five algorithms are called in the following ROOT SETUP, NEXT-LEVEL SETUP, EXTRACT, SIGN and VERIFY. These algorithms can be usually run by either a trusted central workflow engine or a task execution agent. The description of the algorithms are as follows:

(i) ROOT SETUP: This algorithm is performed by the central workflow engine (CWE). It generates the cryptographic system parameters (also simply called "system parameters" in the following) and a master secret on input a security parameter $\lambda$. The system parameters, which include a description of the message space M and the signature space S, will be made publicly available to all execution agents. However, the master secret is known only to the CWE, (ii) NEXT-LEVEL SETUP: All execution agents in the workflow must obtain the system parameters generated by the CWE (it is assumed that the system parameters can be forwarded from the CWE to the first execution agent, who will then forward them to the second execution agent, and so on). This algorithm allows an execution agent to establish a secret value to be used to issue task-based private keys to the subsequent execution agents in the workflow.

(iii) EXTRACT: This algorithm is performed by the CWE or an execution agent with workflow identifiers $ID_{t_j}^j$, where $1 \leq j \leq m$ and $t_j$ denotes the position of the j-th workflow identifier in a workflow namespace. The algorithm computes a private key $S_{i+1}$ for any of the subsequent execution agent in the workflow using the system parameters, its private keys (corresponding to identifiers $ID_{t_j}^j$ for $1 \leq j \leq m$), and any other secret information.

(iv) SIGN: Given a set $SK=\{S_{t_j}^j : 1 \leq j \leq n\}$ of signing (private) keys, a message $M \in M$, and the system parameters, this algorithm outputs a signature $\sigma \in S$.

(v) VERIFY: Given a signature $\sigma \in S$, a set $ID=\{ID_{t_j}^j : 1 \leq j \leq n\}$ of identifiers, a message $M \in M$, and the system parameters, this algorithm outputs valid or invalid.

The consistency condition requires that: if $\sigma$ is output by SIGN on input a set SK of task-based private keys and message M, then VERIFY outputs valid when given input $\sigma$, the set ID of identifiers corresponding to SK, and M.

In one possible example embodiment of the proposed method, the workflow identifier of the subsequent execution agent is chosen as a concatenation of actual execution agent identifiers in the path from the central workflow engine to the subsequent execution agent according to the workflow. This is analogous to an identifier of an entity in a hierarchy when using hierarchical identity-based cryptography as described before.

It is possible that there is a set of workflow identifiers which is to be assigned to the i'th execution agent since the i'th execution agent is located, for example, at a conjunction of the underlying workflow where multiple workflow paths join. Thus, the i'th execution agent also receives a set of task-based private keys corresponding to the set of workflow identifiers. In this case, the workflow identifier of the subsequent execution agent which is used, according to the proposed method, to compute the task-based private key of the subsequent execution agent is based on the set of workflow identifiers of the i'th execution agent and an actual identifier of the subsequent execution agent. This means that the i'th execution agent with multiple workflow identifiers $\{ID_i=ID_{t_j}^j : 1 \leq j \leq m\}$ a task-based private key for a subsequent execution agent at position i+1 with identifier $ID_{i+1}=ID_{i_1}^1, ID_{i_2}^1, \ldots, ID_{i_m}^m$, $id_{i+1}$.

According to a further possible example embodiment of the proposed method, the method further comprises the operation of establishing a secret value to be used to compute the task-based private key for the at least one subsequent execution agent. As will be explained later in the connection with the drawings, the proposed workflow signature scheme comprises, as already described before, according to the one possible example embodiment five algorithms, namely ROOT SETUP, NEXT-LEVEL SETUP, EXTRACT, SIGN, and VERIFY. All these algorithms are usually run by either a trusted central workflow engine or a task execution agent. The algorithm called NEXT-LEVEL SETUP allows an execution agent to establish a secret value to be used to issue task-based private keys to the subsequent agent in the workflow. This random secret value is used together with the system parameters and the at least one workflow identifier assigned to the execution agent as input for finally computing a task-based private key for the subsequent execution agent in the workflow.

According to another example embodiment of the proposed method, the method further comprises the operation of constructing a remaining workflow for the at least one subsequent execution agent after the i'th execution agent has completed its task. That means that the execution agent only transmits that part of the initially created workflow to the subsequent execution agent which remains after the i'th execution agent has completed its task.

According to still a further example embodiment of the proposed method, the method further comprises the operation of verifying the workflow signature that is received from the at least one preceding execution agent by using the received signed workflow information, at least one workflow identifier of the at least one preceding execution agent and the system parameters as input. A successful verification of the workflow signature proves the authenticity of the at least one preceding execution agent, the integrity of the remaining workflow received from the at least one preceding execution agent, the commitment of the at least one preceding execution agent in the workflow sequence and the completion of the task which has been performed by the at least one preceding execution agent and the compliance of the at least one preceding execution agent with the associated task dependencies.

The proposed method may further comprise the operation of authenticating the system parameters that are generally received from the at least one preceding execution agent which ensures that the system parameters are indeed produced by the central workflow engine.

In still a further possible example embodiment of the proposed method, the method further comprises the operation of passing on to the at least one subsequent execution agent also the workflow signatures that the i'th execution agent receives from previous execution agents. This way, the last execution agent in the workflow can send all the workflow signatures generated by each execution agent back to the central workflow engine. The central workflow engine may then validate the completion of each task of the workflow and the compliance of the relevant task dependencies.

It can be also provided according to a further example embodiment of the proposed method that the task-based public key associated with the task-based private key is computed using the system parameters and a workflow identifier which is assigned to the at least one subsequent execution agent. The workflow identifier of the subsequent execution agent is determined by using the at least one workflow identifier assigned to the i'th execution agent and an actual identifier of the at least one subsequent execution agent. It is possible that there is a set of workflow identifiers assigned to the i'th execution agent due to the possibility that the i'th execution agent may be located at a junction where a plurality of workflow branches join. In this case, the whole set of workflow identifiers is generally used to compute the task-based public key of the subsequent execution agent. The computed public key in combination with the random secret value chosen by the i'th execution agent is used for computing the task-based private key for the at least one subsequent execution agent. A possible algorithm which can be used in order to compute a task-based private key in this way will be explained later.

Thus, as part of the computation of the task-based private key, the execution agent computes the corresponding task-based public key using the workflow identifier of the subsequent execution agent.

It is possible that the computed task-based private key has a limited validity period which is enforced by concatenating a lifetime with the at least one workflow identifier which is used to compute the task-based private key. In this way, it can be guaranteed that the access to required objects is only granted during the execution of the specified task. Thus, it is possible to synchronize the authorization flow with the workflow. That means that the computed task-based private key is associated and synchronized with an authorization flow such that access to the private key is granted only during the execution of a respective task.

In a further example embodiment, a system is proposed which is configured to be used for a secure execution of workflow tasks of a workflow to be executed according to a given execution pattern within a decentralized workflow system. The decentralized workflow system has a central workflow engine initiating the workflow and a plurality of task execution agents. The central workflow engine and each task execution agent may own a long-term public-private key pair, respectively, which is used for distributing respective task-based public-private key pairs which in turn are used to protect workflow information. The task-based public-private keys are produced using a workflow signature scheme. Thereby, an i'th execution agent which is selected by at least one preceding execution agent in accord with the execution pattern to perform an i'th task of the workflow is configured to perform at least the following operations:

receiving, from the at least one preceding execution agent via a secure channel, a task-based private key generated by the at least one execution agent immediately before the i'th execution agent;

signing workflow information of the workflow for at least one subsequent execution agent with a workflow signature, wherein the workflow signature is computed using the workflow signature scheme by taking as input at least the task-based private key generated by the at least one preceding execution agent;

selecting at least one appropriate subsequent execution agent;

computing a task-based private key for the at least one subsequent execution agent wherein the task-based private key is computed using system parameters and a workflow identifier assigned to the subsequent execution agent, the workflow identifier assigned to the subsequent execution agent reflecting the subsequent execution agent's position and logical integration in the workflow; and forwarding to the at least one subsequent execution agent the workflow information with its associated workflow signature, the system parameters and the task-based private key for the at least one subsequent execution agent through a secure channel which is generally established using the long-term private key of the i'th execution agent.

Generally, the workflow signature scheme also requires cryptographic system parameters which are provided by the central workflow engine. The central workflow engine generally generates those cryptographic system parameters. Those cryptographic system parameters are generally passed over from one execution agent to one or more subsequent execution agents in accord with the execution pattern. That means that a first execution agent which has to execute a first workflow task of the workflow generally receives the cryptographic system parameters directly from the central workflow engine and forwards those cryptographic system parameters further to at least one subsequent execution agent which has to execute the workflow task subsequent to the first workflow task. Generally, at least a part of the cryptographic system parameters is used, by the i'th execution agent, to compute the workflow signature and the task-based private key, respectively.

According to one possible example embodiment of the proposed system the central workflow engine is configured to perform at least the following operations:

constructing the workflow;

generating the cryptographic system parameters required for the workflow signature scheme;

signing the system parameters with a long-term private key assigned to the central workflow engine;

selecting a first appropriate task execution agent among the plurality of execution agents;

computing a task-based private key for the selected task execution agent; and forwarding the workflow, the cryptographic system parameters and the associated signature and the computed task-based private key to the selected execution agent through a secure channel which is generally established using the central workflow engine's long-term public-private key pair.

It is proposed that the i'th execution agent is further configured to construct a remaining workflow for the at least one subsequent execution agent after the i'th execution agent has completed its task.

According to a further possible example embodiment, the i'th execution agent is further configured to verify the workflow signature that is received from the at least one preceding execution agent.

Furthermore, it is possible that the i'th execution agent is further configured to authenticate the system parameters that are received from the at least one preceding execution agent. The long-term public key of the central workflow engine is assumed to be available to all execution agents by means of bootstrapping, for example. Thus, each execution agent is able to verify a signed copy of the system parameters from the central workflow engine.

In another example embodiment of the proposed system, the i'th execution agent is further configured to pass on to the at least one subsequent execution agent also the workflow signatures that the i'th execution agent received from previous execution agents.

According to another example aspect of the proposed system, the i'th execution agent is further configured to compute the task-based public key associated with the task-based private key using the system parameters and a workflow identifier which is assigned to the at least one subsequent execution agent. The workflow identifier of the at least one subsequent execution agent may be determined by using at least one workflow identifier assigned to the i'th execution agent and an actual identifier of the at least one subsequent execution agent. The computed task-based public key is used in combination with a random secret value chosen by the i'th execution agent for computing the task-based private key for the at least one subsequent execution agent. The workflow identifier of the at least one subsequent execution agent may also be determined by using a plurality of workflow identifiers which are assigned to the i'th execution agent due to the fact that the i'th execution agent may be located at a joining point of different workflow branches of the underlying workflow.

Example embodiments of any of the techniques described above may include a method or process, a system or instructions stored on a machine-readable storage device. The details of the particular example embodiments are set forth in the accompanying drawings and description below. Other features will be apparent from the following description, including the drawings, and the claims.

Generally, a workflow comprises a set of tasks and associated task dependencies that control the coordination among these tasks. In the following a task will be denoted as $t_i$ and its execution agent will be denoted as $A(t_i)$. In a decentralized inter-organizational workflow, execution agents are usually different, autonomous distributed systems, and evaluation of task dependencies are performed by the execution agents without relying on a central workflow engine. FIG. 1 shows an example of such a decentralized workflow.

FIG. 1 shows a business travel planning process that makes a flight or train ticket booking, and a hotel room and car reservations. The workflow as shown in FIG. 1 comprises different tasks $t_1$ to $t_8$ which are described as following:

- $t_1$: input travel information;
- $t_2$: book a flight ticket from Key Travel;
- $t_3$: if the ticket costs more than 200 Euro and the distance to a destination is less than 600 kilometers, hook a train ticket from Rail Europe;
- $t_4$ obtain manager's approval;
- $t_5$: purchase the train ticket from Rail Europe;
- $t_6$: purchase the flight ticket from Key Travel;
- $t_7$: reserve a room from Hotel Booker;
- $t_8$: rent a car at Eurocar.

It is assumed in the following that in decentralized workflow control, the entire workflow is initiated by a central workflow engine CWG and is then forwarded to a first execution agent, execution agent $A(t_1)$ in the example workflow shown in FIG. 1. Upon completion of task $t_1$, execution agent $A(t_1)$ generates a remaining workflow $(t_2, \ldots, t_8)$ and forwards this remaining workflow to execution agent $A(t_2)$. Execution agent $A(t_2)$ is then expected to execute task $t_2$ and send the remaining workflow $(t_4, \ldots, t_8)$ to execution agent $A(t_4)$. In addition, execution agent $A(t_2)$ must evaluate a task dependency for $t_2 \rightarrow t_3$. If the price of the flight ticket is more than 200 Euro and the distance to the destination is less than 600 kilometers, execution agent $A(t_2)$ would also send the remaining workflow $(t_3, \ldots, t_8)$ to execution agent $A(t_3)$. Next, execution agent $A(t_4)$ who in this case should be the manager of the requester, decides whether the requester should purchase flight or train ticket, perhaps based on the current company budget and after discussing with the requester. In other words, execution agent $A(t_4)$ would either forward tasks $t_6, t_7, t_8$, to execution agent $A(t_6)$ if the flight ticket is to be purchased, or tasks $t_5, t_7, t_8$, to execution agent $A(t_5)$ if it decides to go for the train ticket. Subsequently, execution agent $A(t_7)$, followed by execution agent $A(t_8)$ execute their respective tasks. At the end, execution $A(t_8)$ reports the results back to the central workflow engine CWE.

It is to be noted that for simplicity of exposition, although possible, above workflow does not consider all possible task dependencies, for example the case when task $t_2$ fails, or both tasks $t_2$ and $t_3$ fail. Nevertheless, the example as shown and described above is sufficient to present in the following the core idea of the present disclosure, e.g. using hierarchical cryptographic primitives in decentralized workflow systems.

FIG. 1 shows an example workflow which will be used to show how workflow signatures can be used in decentralized workflow systems to authenticate execution agents, protect workflow integrity and provide proofs of commitment for a task execution and proofs of compliance with a workflow sequence. Moreover, it will be shown that it is possible to preserve the anonymity of execution agents within a workflow when necessary. For instance, in the above example, Key Travel (a flight reservation agency) and Rail Euro (a train service provider) can be regarded as execution agents that belong to the same conflict-of-interest group. Hence, this may lead to unfair competition between the two organizations. Ideally, Key Travel should not be able to learn the identity of execution agent $A(t_3)$ and the associated task dependency $(t_2 \rightarrow t_3)$. This way, Key Travel cannot intentionally manipulate the price of the ticket to win the business and prevent the customer from getting a good bargain offered by Rail Euro, for example.

Figure 2:
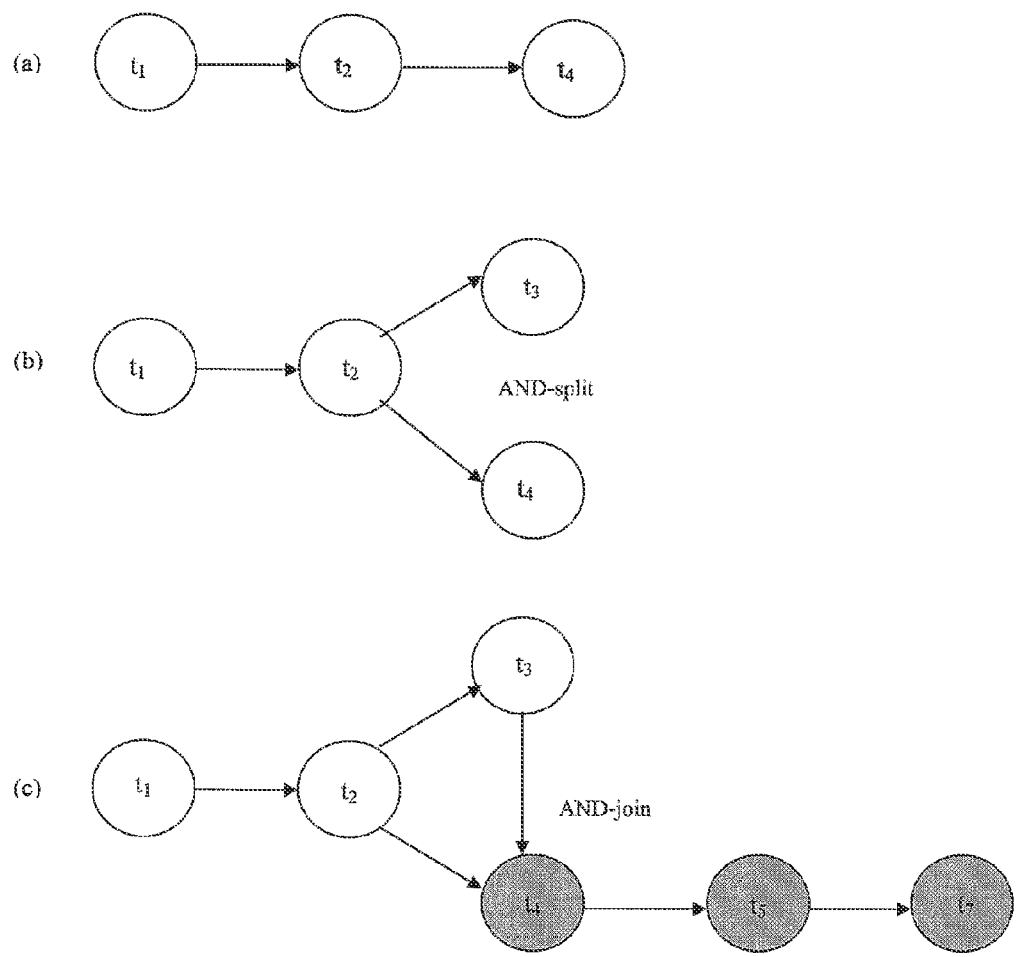
FIG. 2 shows different examples of workflow namespaces and patterns in workflow signatures, based on the business travel planning workflow shown in FIG. 1.

FIG. 2 shows different examples of workflows which are based on the business travel planning workflow shown in FIG. 1. It is assumed that a central workflow engine CWE of a decentralized workflow system acts as the root private key generator of a multi-key hierarchical signature scheme. As part of the initialization of the business travel planning workflow, the central workflow engine CWE generates a private key $S_1$ for the first execution agent in the workflow, e.g. execution agent $A(t_1)$, for which the corresponding public key $P_1$ is associated to an identifier specifying task $t_1$, e.g. $ID_1 = t_1$. Workflow information and the private key are securely transmitted to execution agent $A(t_1)$ from the central workflow engine CWE. It is assumed that confidential or sensitive information can be transmitted from one execution agent to another in an authenticated and secure manner via a secure channel. This will be further discussed later. After execution agent $A(t_1)$ has completed its task, it generates the remaining workflow, namely in the form of $(t_2, \ldots, t_8)$ and computes a private key $S_2$ for the subsequent execution agent $A(t_2)$, the private key computation being based on identifier $ID_2 = t_1, t_2$. The remaining workflow and the private key $S_2$ are then forwarded to execution agent $A(t_2)$ via a secure transmission channel.

Next, assuming that a flight ticket costs less than 200 Euro, execution agent $A(t_2)$ computes private key $S_4$ based on workflow identifier $ID_4 = t_1, t_2, t_4$ and transmits it together with a generated remaining workflow comprising tasks $t_4, \ldots, t_8$ to execution agent $A(t_4)$. This simple, sequential workflow is illustrated in FIG. 2a. In hierarchical signatures, such a workflow is simply a tree of three levels with each level containing only a single leaf node corresponding here to a respective execution agent.

On the other hand, if the flight ticket costs more than 200 Euro and the distance to the destination is less than 600 kilometers, execution agent $A(t_2)$ has to also produce a private key $S_3$ based on workflow identifier $ID_3 = t_1, t_2, t_3$ in addition to private key $S_4$. This is to reflect an AND-split relation in the workflow as shown in FIG. 2b.

If both tasks $t_2$ and $t_3$ are executed, then there is an AND-join at task $t_4$, as shown in FIG. 2c. In this case, execution agent $A(t_4)$ receives private keys based on workflow identifier $ID_4^1 = t_1, t_2, t_4$ and $S_4^2$ based on workflow identifier $ID_4^2 = t_1, t_2, t_3, t_4$ from execution agent $A(t_2)$ and $A(t_3)$, respectively. This is analogous to a hierarchy for multi-key hierarchical signatures.

It is to be noted from FIG. 1 that there is also an OR-split relation between task $t_4$ and the immediate subsequent tasks. However, this has no effect to the workflow namespace, as mentioned above. It is to be noted that task $t_4$ and the subsequent tasks in the remaining workflow represented by shaded nodes in FIG. 2c can be perceived as a non-multi-key hierarchical namespace for hierarchical signatures.

By means of the shown example workflow the workflow namespace involved when computing the associated private keys has been clearly explained and discussed. The usage of the computed task-based private keys by the respective execution agents to compute workflow signatures on workflow information is described in connection with FIGS. 3 to 7.

FIG. 3 formally shows the workflow signature scheme as it can be used in one possible example embodiment of the proposed method or system.

ROOT SETUP: The CWE:
1. runs $\mathcal{G}$ on input $\lambda$ to generate $G$ and $G_T$ of prime order $q$ and an admissible pairing e: $G \times G \rightarrow G_T$;
2. chooses a generator $P_0 \in G$;
3. picks a random value $s_0 \in Z_q^*$ and sets $Q_0 = s_0 P_0$;
4. selects cryptographic hash functions $H_1: \{0,1\}^* \rightarrow G$ and $H_2: \{0,1\}^* \rightarrow G$.

The CWE's master secret is $s_0$ and the system parameters are $<G, G_T, e, q, P_0, Q_0, H_1, H_3>$. The message space is $M=\{0,1\}^*$ and the signature space is $S=\cup_{t\geq 0} G^{t+1}$.

NEXT-LEVEL SETUP: An execution agent at position $t \geq 1$ in a workflow picks a random secret $s_t \in Z_q^*$.

EXTRACT: An execution agent with one or multiple identifiers $ID=\{ID_{(t-1)_j}^j: 1 \leq j \leq m\}$ issues a task-based private key for another execution agent at position t with workflow identifier $ID_t = ID_{(t-1)_1}, \ldots, ID_{(t-1)_m}$ by performing the following operations:
1. computes $P_t = H_1(ID_t) \in G$;
2. sets $$S_t = \sum_{j=1}^{n} S_{(t-1)_j}^i + s_{t-1} P_t;$$

3. defines $Q=\{Q_i^j = s_i P_o: 1 \leq i \leq (t-1)_j, 1 \leq j \leq m\}$.

The private key $<S_t, Q>$ is given to the execution agent by its parent.

SIGN: Given any $n \geq 1$ and a set $SK=\{<S_{t_j}^j, Q_i^j>: 1 \leq j \leq n, 1 \leq i \leq t_j -1\}$ of n task-based private keys associated with a set $ID=\{ID_{t_j}^j: 1 \leq j \leq n\}$ of workflow identifiers, and a message M, the signer:
1. chooses a secret value $s_\phi \gamma Z_q^*$;
2. computes $P_M = H_2 (ID_{t_1}^1, \ldots, ID_{t_n}^n \| M)$;
3. calculates $$\varphi = \sum_{j=1}^{n} S_{t_j}^j + s_\varphi P_M \text{ and } Q_\varphi, s_\varphi P_0.$$

The algorithm outputs the signature $\sigma = <\phi, Q, Q_\phi>$, where $Q=\{Q_i^j: 1 \leq i \leq t_j-1, 1 \leq j \leq n\}$.

VERIFY: Given $\sigma = <\phi, Q, Q_\phi>$, a set of workflow identifiers $ID=\{ID_{t_1}^1, \ldots, ID_{t_n}^n\}$ and a message M, the verifier:
1. computes $P_i^j = H_1(ID_i^j)$ for $1 \leq i \leq t_j$ and $1 \leq j \leq n$.
2. computes $P_M = H_2(ID_{t_1}^1, \ldots, ID_{t_n}^n \| M)$ (first arranging the workflow identifiers lexicographically if they are not already in this order);
3. checks if $e(P_0, \sigma)$ is equal to $$\left( \prod_{j=1}^{n} \prod_{i=1}^{t_j} e(Q_{i-1}^j, P_i^j) \right) e(Q_\varphi, P_M)$$

outputting valid if this equation holds, and invalid otherwise.

This can be retraced as follows:

$$e(P_0, \varphi) = e\left(P_0, \sum_{j=1}^{n} S_{t_j}^j + s_\varphi P_M\right)$$

if $S_{t_j}^j = S_{t_{j-1}}^j + s_{t_{j-1}}^j P_{t_j}^j$ then $$= e(P_0, s_\varphi P_M) \prod_{j=1}^{n} e(P_0, S_{t_{j-1}}^j + s_{t_{j-1}}^j P_{t_j}^j)$$

$$= e(P_0, s_\varphi P_M) \prod_{j=1}^{n} e(P_0, S_{t_{j-1}}^j) e(s_{t_{j-1}}^j P_0, P_{t_j}^j)$$

$$= e(P_0, s_\varphi P_M) \prod_{j=1}^{n} e(P_0, S_{t_{j-1}}^j) e(Q_{t_{j-1}}^j, P_{t_j}^j)$$

$$= e(P_0, s_\varphi P_M) \prod_{j=1}^{n} e(P_0, S_{t_{j-2}}^j) e(Q_{t_{j-1}}^j, P_{t_j}^j) e(Q_{t_{j-2}}^j, P_{t_{j-1}}^j)$$

$$\vdots$$

$$= \left( \prod_{j=1}^{n} \prod_{i=1}^{t_j} e(Q_{t-1}^j, P_i^j) \right) e(Q_\varphi, P_M)$$

It is to be noted that when there is an AND-join relation within a workflow at position t−1, the associated execution agent with a set of workflow identifiers $ID_{t-1}$ possesses more than one task-based private key, obtained from execution agents at positions immediately before t−1. Hence, when the execution agent with the set of workflow identifiers $ID_{t-1}$ a task-based private key for the subsequent execution agent with a workflow identifier $ID_t$ in the workflow, the former execution agent combines its task-based private keys which are based on the set of workflow identifiers $ID_{t-1}$ with a parameter computed using its secret value $s_{t-1}$. This operation is, in fact, analogous to creating a multi-key signature on public key $P_t$ instead of message M. It is also worth noting that the public key $P_t$ is computed based on a set of workflow identifiers which captures the AND-join relation at position t−1 in the workflow by including all the relevant workflow identifiers $(ID_{(t-1)_1}, \ldots, ID_{(t-1)_m})$.

If the above-mentioned and explained EXTRACT algorithm is executed by an execution agent who has only one workflow identifier (m=1), then the proposed workflow signature scheme works identically to the already mentioned Lim-Paterson multi-key hierarchical signature scheme.

Figure 4:
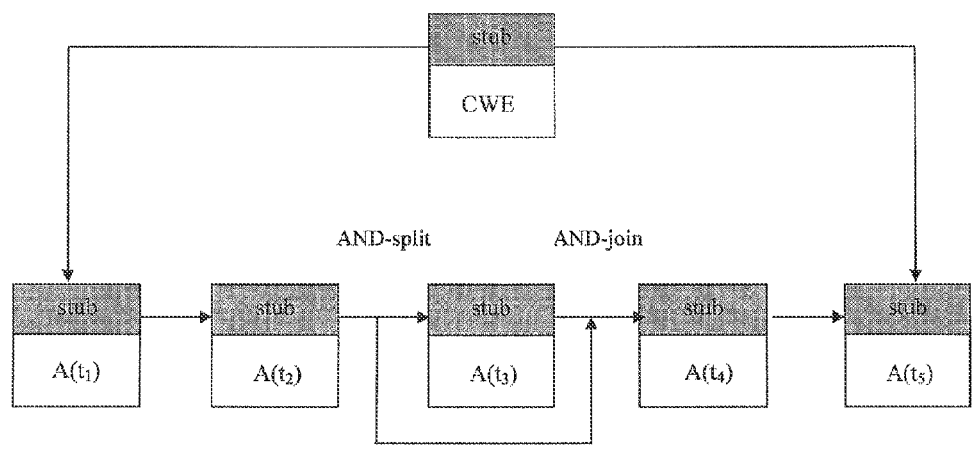
FIG. 4 shows an architectural overview of a decentralized workflow system as a simplified version of the workflow shown in FIG. 1.

FIG. 4 shows an architectural overview of a decentralized workflow management system as a simplified version of the workflow shown in FIG. 1 that contains only five execution agents $A(t_1)$-$A(t_5)$. The workflow as shown in FIG. 4 comprises an AND-split relation after completion of task $t_2$ and then an AND-join relation at execution agent $A(t_4)$. Generally it is assumed that in a decentralized workflow management system there exists a central workflow engine CWE controlled by a central management system accessible by other agents. As already described before, the role of the central workflow engine CWE is to initiate a workflow to be sent to an appropriate first execution agent. However, inter-organizational task dependencies are evaluated and enforced among the relevant execution agents without relying on the central workflow engine CWE. The final result of the workflow is then sent to the central workflow engine CWE by the last execution agent in the workflow, As with what has been proposed by Atluri et al, in document "V. Atluri, S. A. Chun, and P. Mazzoleni. Chinese wall security for decentralized workflow management systems. Journal of Computer Security, 12(6): 799 to 840, December 2004", it is assumed that workflow task related information is communicated in the form of a self-describing workflow between two so-called workflow stubs. A self-describing workflow contains information about a task t and the precondition to execute it, all the tasks that follow t and the dependencies among them, the task execution agent A(t) and other information related to the input and output of the task t. A workflow stub is to be understood as a small component attached to a task execution agent which evaluates the precondition and control information of task dependencies, constructs the remaining self-describing workflows for subsequent execution agents and forwards each self-describing workflow to the relevant execution agent. In the example shown here it is envisaged that the workflow stub also performs all cryptographic operations involved during an execution of a task.

Each task execution agent generally owns a long-term public-private key pair which will be used for distributing task-based public-private key pairs, which in turn are used to protect workflow information. Those task-based public-private key pairs may be limited in lifetime, e.g. the validity period of a task-based public-private key pair can be enforced by concatenating a specific lifetime LT, in a fixed format, with a corresponding workflow identifier. Furthermore, the central workflow engine generally also has a long-term public key which is available to all execution agents. The task-based keys are computed as needed or in a just-in-time manner rather than pre-computed as in the approach of document "F. Montagut and R. Molva. Traceability and integrity of execution in distributed workflow management systems. In J. Biskup and J. Lopez, editors, Proceedings of the 12$^{th}$ European Symposium on Research in Computer Security (ESORICS 2007), pages 251 to 266. Springer-Verlag LNCS 4734, 2007".

Moreover, the task-based keys are produced using a workflow signature scheme which produces workflow signatures with additional properties compared to classical digital signatures useful for workflow systems. When computing a task-based public key, task information along with a lifetime LT is used as the workflow identifier. FIG. 5 shows the task-based public-private key set for each execution agent involved in the workflow shown in FIG. 4.

Execution agent $A(t_1)$ has a workflow identifier $ID_1 = t_1 \| LT_1$. Therewith, a public key can be computed according to the workflow signature scheme as shown in FIG. 3 by using the formula $P_1 = H_1(ID_1)$ wherein $H_1$ is a hash function and forms a part of the system parameters given by the central workflow engine. The private key which is computed for this execution agent by the central workflow engine is $S_1 = s_0 P_1$. The next execution agent $A(t_2)$ has an associated workflow identifier $ID_2 = t_1, t_2 \| LT_2$. By means of this workflow identifier a public key $P_2$ can be computed by $P_2 = H_2(ID_2)$. Therefrom, according to the algorithms of the workflow signature scheme as shown in FIG. 3, the private key corresponds to $<S_2, Q_1>$ with $S_2 = S_1 + s_1 P_2$ and $Q_1 = s_1 P_0$. Because of the AND-split relation between the execution agents $A(t_2)$ and $A(t_3)$ and the AND-join relation after the execution agent $A(t_3)$ the following execution agent $A(t_4)$ gets two workflow identifiers, namely one identifier $ID_4^1 = t_1, t_2, t_4 \| LT_4^1$ directly from execution agent $A(t_2)$ and a further workflow identifier $ID_4^2 = t_1, t_2, t_3, t_4 \| LT_4^2$ from the execution agent $A(t_3)$. Because of those two workflow identifiers which form a set of workflow identifiers for the execution agent $A(t_4)$, there result two task-based public keys and two corresponding task-based private keys as shown in the table of FIG. 5. The last execution agent $A(t_5)$ has only one workflow identifier $ID_5$ resulting from a combination of the set of identifiers $ID_4^1$ and $ID_4^2$ of the execution agent $A(t_4)$. Therefore, the last execution agent $A(t_5)$ only has one public key $P_5 = H_1(ID_5)$ and one task-based private key $<S_5, Q>$ associated with this execution agent with $Q = \{Q_1, Q_2, Q_3, Q_4 = S_4 P_0\}$.

It is to be noted that the execution agents long-term keys which can be provided can also be renewed or revoked through a public key infrastructure. On the other hand, since task-based keys are generally short-lived, there is no major concern for revocation of these long-term keys.

Figure 6:
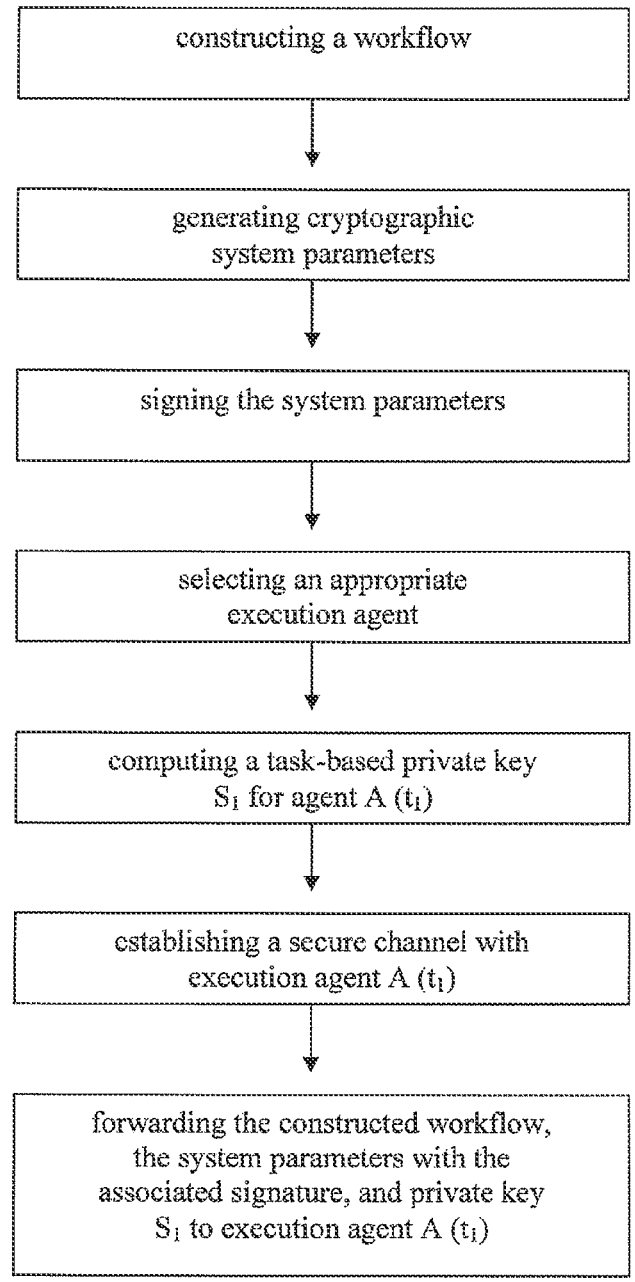
FIG. 6 shows a flowchart of a possible workflow initialization process performed by one possible example embodiment of a proposed central workflow engine.

FIG. 6 shows a flowchart representing a workflow initialization process performed by a central workflow engine as provided according to the proposed method.

In a first operation, the central workflow engine constructs a self-describing workflow.

In a second operation, the central workflow engine generates necessary cryptographic systems parameters required for the workflow signature scheme as proposed according to the method as disclosed herein.

In a third operation, the central workflow engine signs the system parameters with a long-term private key associated with the central workflow engine, for example, using the standard RSA signature scheme.

In a fourth operation, the central workflow engine selects an appropriate first execution agent $A(t_1)$, for example, through a service discovery service.

In a fifth operation, it computes a task-based private key $S_1$ for the first execution agent $A(t_1)$.

Then, it establishes a secure channel with execution agent $A(t_1)$ using its long-term key pair, for example, through the widely used TLS (also known as SSL) protocol ("T. Dierks and C. Allen. The TLS protocol version 1.0. The Internet Engineering Task Force (IETF), RFC 2246, January 1999").

Finally, the central workflow engine forwards the self-describing workflow, the cryptographic system parameters and the associated signature and task-based private key $S_1$ to the first execution agent $A(t_1)$ through the secure channel.

Figure 7:
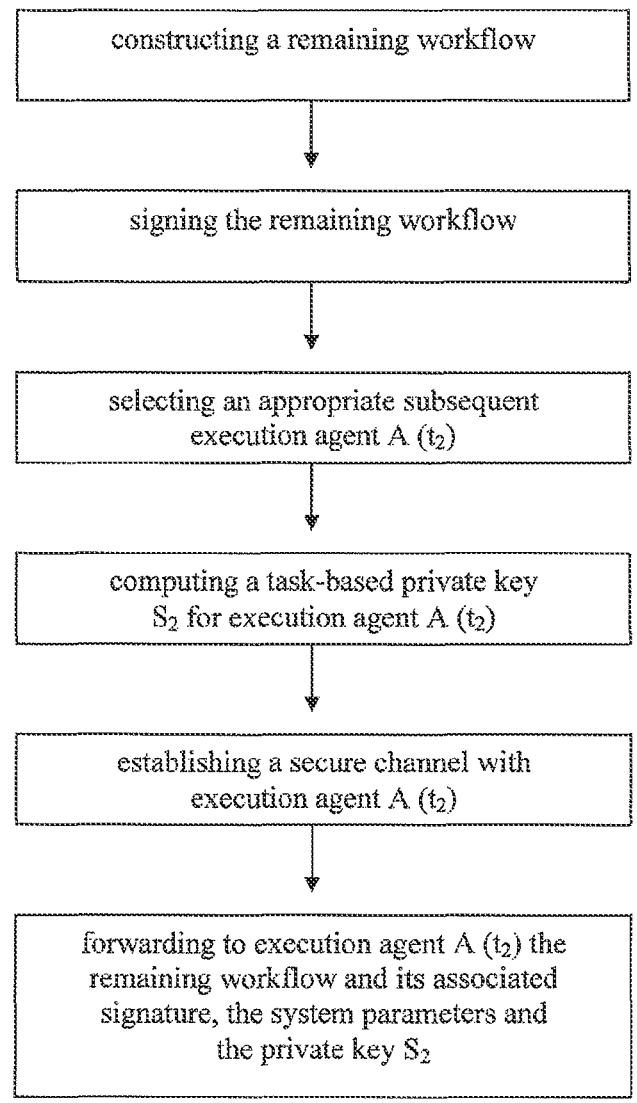
FIG. 7 shows a flowchart of a possible example embodiment of the proposed method.

Upon receiving all the relevant information from the central workflow engine, first execution agent $A(t_1)$ first evaluates any required pre-condition and task dependencies before executing task $t_1$. After having executed task $t_1$, the first execution agent $A(t_1)$ performs the following operations as shown in FIG. 7.

In the first operation it constructs a self-describing workflow for a subsequent execution agent $A(t_2)$.

In a second operation, it signs the self-describing remaining workflow using the workflow signature scheme by taking as input its task-based private key $S_1$ which it received from the central workflow engine.

In a third operation, it selects an appropriate subsequent execution agent $A(t_2)$.

Then, in a fourth operation, it computes a task-based private key $S_2$ for execution agent $A(t_2)$.

In a fifth operation, it establishes a secure channel with execution agent $A(t_2)$ with a long-term credential associated with it.

Finally, it forwards to execution agent $A(t_2)$ the self-describing workflow and its associated workflow signature, the cryptographic system parameters and task-based private key $S_2$ through the secure channel.

Before executing task $t_2$, execution agent $A(t_2)$ performs the necessary pre-condition and dependency checks. In addition, it checks the authenticity of the cryptographic system parameters as described before and verifies the workflow signature that is received from execution agent A(t₁). Authenticating the system parameters ensures that they are indeed produced by the central workflow engine. On the other hand, successful verification of the workflow signature proves the authenticity of execution agent A(t₁), the integrity of the self-describing workflow, the commitment of execution agent A(t₁) in the workflow sequence, and the completion of task t₁ and the compliance of agent A(t₁) with the associated task dependencies.

After execution agent A(t₂) has completed its task, it prepares the necessary remaining workflow and related information as what agent A(t₁) did before in a similar manner, and forwards that to the subsequent execution agent. The subsequent remaining agents also follow the same process.

It is to be noted that execution agent A(t₁) should also pass on the workflow signatures $\sigma_i$, for $0<i<t-1$, that it has received from the previous execution agents. This way, the last execution agent in the workflow can send all the workflow signatures generated by each execution agent back to the central workflow engine. The central workflow engine can then validate the completion of each task and the compliance of the relevant, task dependencies.

It is also to be noted that, assuming workflow identifiers do not contain the actual identities of their respective execution agents, the usage of the proposed method and system also provides pseudo-anonymity, that each execution agent only knows the identities of the execution agent from which it receives workflow information and the execution agent to which it forwards the remaining workflow information.

Furthermore, it is to be noted that the workflow signature produced by an execution agent A(t₁) proves its authenticity not only to the subsequent execution agent A(t₂), but also to any other subsequent execution agent that receives and can successfully verify the workflow signature.

The proposed instantiated workflow signature scheme can be implemented using a library which supports pairing computations on elliptic curves, for example the MIRACL library as further described in document "Shamus Software Ltd. MIRACL. Available at web address "http://www" followed by "dot shamus dot ie/", last accessed in September 2008.

When a central workflow engine initializes a workflow, it generates a set of cryptographic system parameters <G, $G_T$, e, q, $P_0$, $H_1$, $H_2$> where G, $G_T$ are groups of large prime order q and e is an admissible pairing defined as $G_1 \times G_1 \rightarrow G_2$. In order to achieve roughly similar security level to 1024-bit RSA keys using the task-based keys as described in the previous sections, it is also possible to work with a supersingular elliptic curve of embedding degree 4 over $F_{3^{271}}$ ("S. D. Galbraith. Supersingular curves in cryptography. In C. Boyd, editor, Advances in Cryptology. Proceedings of ASIACRYPT 2001, pages 495 to 513. Springer-Verlag LNCS 2248, December 2001"). This choice results a corresponding group of prime order q approximately equal to $2^{252}$. Using point compressions, elements of this group can be represented using 272 bits. Since all arithmetic is carried out in fields of characteristic 2, group operations and pairing computations can be implemented efficiently. Other selections of parameters can be used to achieve similar levels of efficiency. In addition to the curve and group selections, hash functions $H_1$ and $H_2$ are required which map arbitrary strings onto elements of $G_2$.

The invention claimed is:

1. A computer-implemented method for a secure execution of workflow tasks of a workflow, the computer-implemented method comprising:

receiving, from a preceding execution agent, a task-based private key generated by the preceding execution agent;

signing workflow information of a workflow for a subsequent execution agent with a workflow signature, the workflow signature being computed using a workflow signature scheme by taking as input at least the task-based private key;

forwarding to the subsequent execution agent the workflow information with its associated workflow signature; and computing the task-based private key for the subsequent execution agent, the task-based private key being computed using system parameters and a workflow identifier assigned to the subsequent execution agent, the workflow information further being forwarded with the task-based private key.

2. The computer-implemented method of claim 1, wherein the task-based private key is produced using the workflow signature scheme.

3. The method according to claim 1, wherein the workflow identifier assigned to the subsequent execution agent is chosen as a concatenation of actual execution agent identifiers in a path from a central workflow engine to an i'th execution agent and further to the subsequent execution agent according to the workflow.

4. The method according to claim 1, the method further comprising establishing a secret value to be used to compute the task-based private key for the subsequent execution agent.

5. The method according to claim 1, the method further comprising constructing a remaining workflow for the subsequent execution agent after an i'th execution agent has completed its task.

6. The method according to claim 1, the method further comprising verifying a workflow signature that is received from the preceding execution agent by using signed workflow information that is received from the preceding execution agent, a workflow identifier assigned to an i'th execution agent and system parameters as input.

7. The method according to claim 1, the method further comprising authenticating system parameters that are received from the preceding execution agent.

8. The method according to claim 1, the method further comprising passing on to the subsequent execution agent also the workflow signatures that an i'th execution agent received from previous execution agents.

9. The method according to claim 1, wherein forwarding to the subsequent execution agent the workflow information with its associated workflow signature further includes forwarding, with the workflow information and its associated workflow signature, system parameters and a task-based private key for the subsequent execution agent through a secure channel, the task-based private key being computed using the system parameters and a workflow identifier assigned to the subsequent execution agent.

10. A computer-implemented system, comprising:

a plurality of task execution agents, the plurality of task execution agents including an i'th execution agent, the i'th execution agent implemented by one or more processors and configured to:

receive, from a preceding execution agent from the plurality of task execution agents, a task-based private key generated by the preceding execution agent;

sign workflow information of a workflow for a subsequent execution agent with a workflow signature, the workflow signature being computed using a workflow signature scheme by taking as input at least the task-based private key; and forward, to a subsequent execution agent from the plurality of task execution agents, the workflow information with its associated workflow signature;

wherein the i'th execution agent is further configured to compute the task-based private key for the subsequent execution agent, the task-based private key being computed using system parameters and a workflow identifier assigned to the subsequent execution agent, the workflow information further being forwarded with the task-based private key.

11. The computer-implemented system of claim 10, wherein the task-based private key is produced using the workflow signature scheme.

12. The system according to claim 10, wherein the workflow identifier assigned to the subsequent execution agent is chosen as a concatenation of actual execution agent identifiers in a path from a central workflow engine to the i'th execution agent and further to the subsequent execution agent according to the workflow.

13. The system according to claim 10, wherein the i'th execution agent is further configured to establish a secret value to be used to compute the task-based private key for the subsequent execution agent.

14. The system according to claim 10, wherein the i'th execution agent is further configured to construct a remaining workflow for the subsequent execution agent after the i'th execution agent has completed its task.

15. The system according to claim 10, wherein the i'th execution agent is further configured to verify a workflow signature that is received from the preceding execution agent by using signed workflow information that is received from the preceding execution agent, a workflow identifier assigned to the i'th execution agent and system parameters as input.

16. The system according to claim 10, wherein the i'th execution agent is further configured to authenticate system parameters that are received from the preceding execution agent.

17. The system according to claim 10, wherein the i'th execution agent is further configured to pass on to the subsequent execution agent also the workflow signatures that the i'th execution agent received from previous execution agents.

18. A non-transitory computer-readable medium storing executable instructions thereon, which, when executed by a processor, cause the processor to perform operations comprising:
  receiving, from a preceding execution agent from a plurality of task execution agents, a task-based private key generated by the preceding execution agent;
  signing workflow information of a workflow for a subsequent execution agent with a workflow signature, the workflow signature being computed using a workflow signature scheme by taking as input at least the task-based private key;
  forwarding, to a subsequent execution agent from the plurality of task execution agents, the workflow information with its associated workflow signature; and
  computing the task-based private key for the subsequent execution agent, the task-based private key being computed using system parameters and a workflow identifier assigned to the subsequent execution agent, the workflow information further being forwarded with the task-based private key.

* * * * *